US005249418A

United States Patent [19]

Finn

[11] Patent Number: 5,249,418

[45] Date of Patent: Oct. 5, 1993

[54] GAS TURBINE ENGINE POLYGONAL STRUCTURAL FRAME WITH AXIALLY CURVED PANELS

[75] Inventor: Martin T. Finn, Cincinnati, Ohio

[73] Assignee: General Electric Company, Cincinnati, Ohio

[21] Appl. No.: 760,533

[22] Filed: Sep. 16, 1991

[51] Int. Cl.[5] .......... F02C 7/20; F02G 3/00

[52] U.S. Cl. .......... 60/39.31; 60/271

[58] Field of Search .......... 60/39.31, 39.5, 271

[56] References Cited

U.S. PATENT DOCUMENTS

| | | | |
|---|---|---|---|
| 2,724,544 | 11/1955 | Hardigg | 230/132 |
| 3,024,969 | 3/1962 | Russell | 230/133 |
| 3,088,278 | 5/1963 | Franz | 60/39.31 |
| 3,708,242 | 1/1973 | Bruneau et al. | 415/217 |
| 4,492,078 | 1/1985 | Williamson | 60/39.31 |

FOREIGN PATENT DOCUMENTS

| | | | |
|---|---|---|---|
| 0733362 | 7/1955 | United Kingdom . | |
| 0877989 | 9/1961 | United Kingdom . | |
| 2151709 | 7/1985 | United Kingdom | 60/39.31 |
| 2158161 | 11/1985 | United Kingdom . | |
| 2207707 | 2/1989 | United Kingdom . | |

OTHER PUBLICATIONS

General Electric CF6-80C2 Poster, Reed Business Publishing, 1987./

*Primary Examiner*—Richard A. Bertsch
*Assistant Examiner*—Howard R. Richman
*Attorney, Agent, or Firm*—Jerome C. Squillaro

[57] ABSTRACT

A turbine rear structural frame of polygonal shape for use in a gas turbine engine is modified to have axially curved panels. The structural frame includes an annular outer shell, an annular inner central hub, and a plurality of circumferentially-spaced struts extending between and connected to the outer shell and central hub. The annular outer shell includes a plurality of panels connected end-to-end with one another. Each panel has a curved configuration and the outer shell has a central axis. The curved configuration of each panel of the outer shell runs in the direction of the axis.

4 Claims, 3 Drawing Sheets

GAS TURBINE ENGINE POLYGONAL STRUCTURAL FRAME WITH AXIALLY CURVED PANELS

BACKGROUND OF THE INVENTION

1. Field of the Invention

The present invention relates generally to gas turbine engines and, more particularly, to a modified structural frame in a turbine engine having axially curved polygonal panels.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a forward fan. The forward fan provides the main propulsive thrust generated by the engine.

The static parts of a gas turbine engine, namely, frames, casings and mounts, are components that do not rotate but instead provide the overall backbone of the engine. These static components must maintain alignment between the rotors and stators of the engine. In many instances, this requirement dictates a need for stiffness, rather than strength, in the construction of the frames.

A structural frame component in a turbine engine typically is a static part that supports bearings which, in turn, support the rotatable rotors of the engine. The common elements of a structural frame component, such as a turbine rear structural frame located at the rear end of the low pressure turbine, are outer and inner shells and a plurality of circumferentially-spaced radial struts extending between the shells.

Heretofore, the panels forming the outer shell configuration have low critical buckling stress resistance and thus require circumferential stiffening ribs to increase buckling resistance capability under compression loads. However, the stiffening ribs provide sites for concentration of stresses and initiation of cracks.

Consequently, a need exists for an alterative design for a rear structural frame that will increase buckling resistance without introducing any new problems.

SUMMARY OF THE INVENTION

The present invention provides a modified structural frame with axially curved panels designed to satisfy the aforementioned needs. The curvature of the panels increases the buckling resistance capability under compressive loads and reduces the need for stiffening ribs which have been the sites for crack initiation and propagation in prior art frames.

Accordingly, the present invention is directed to a modified structural frame for use in a gas turbine engine which comprises: (a) an annular outer shell; (b) an annular inner central hub; and (c) a plurality of circumferentially-spaced struts extending between and connected to the outer shell and central hub in forming a polygonal shape. The annular outer shell includes a plurality of panels connected end-to-end with one another with each panel having a curved configuration. The outer shell has a central axis. The curved configuration of each panel of the outer shell runs in the direction of the axis.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
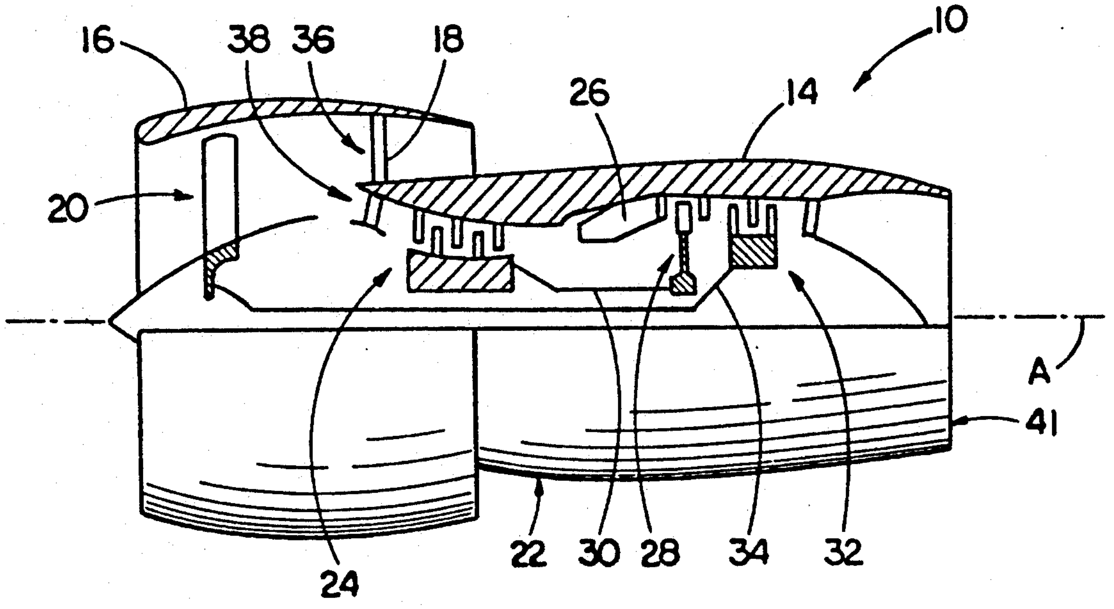
FIG. 1 (PRIOR ART)
FIG. 1 is a schematic representation of a prior art gas turbine engine in which a modified structural frame of the present invention can be employed.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Enoine

Referring now to the drawings, and particularly to FIG. 1, there is schematically illustrated a prior art gas turbine engine, generally designated 10, to which can be applied the modified turbine rear structural frame 12 (FIG. 6) of the present invention. The engine 10 has a longitudinal center line or axis A and an outer stationary annular casing 14 and nacelle 16 disposed coaxially and concentrically about the axis A. The nacelle 16 is supported about the forward end of the casing 14 by a plurality of struts 18, only one of which being shown in FIG. 1.

The engine 10 includes a forward fan 20 disposed within the nacelle 16 and a core gas generator engine 22 disposed rearwardly of the fan 20 and within the stationary casing 14. The core engine 22 is composed of a multi-stage compressor 24, a combustor 26, and a high pressure turbine 28, either single or multiple stage, all arranged coaxially about the longitudinal axis A of the engine 10 in a serial, axial flow relationship. An annular outer drive shaft 30 fixedly interconnects the compressor 24 and high pressure turbine 28. The engine 10 further includes a low pressure turbine 32 disposed rearwardly of the high pressure turbine 28. The lower pressure turbine 32 is fixedly attached to an inner drive shaft 34 which, in turn, is connected to the forward fan 20. Conventional bearings and the like have been omitted from FIG. 1 in the sake of clarity.

In operation, air enters the gas turbine engine 10 through an air inlet of the nacelle 16 surrounding the forward fan 20. The air is compressed by rotation of the fan 20 and thereafter is split between an outer annular passageway 36 defined between the nacelle 16 and the engine casing 14, and a core engine passageway 38 having its external boundary defined by the engine casing 14. The pressurized air entering the core engine passageway 38 is further pressurized by the compressor 24. Pressurized air from the compressor 24 is mixed with fuel in the combustor 26 and ignited, thereby generating combustion gases. Some work is extracted from these gases by the high pressure turbine 28 which drives the compressor 24. The remainder of the combustion gases are discharged from the core engine 22 into the low pressure power turbine 32 to drive the forward fan 20. The portion of the air flow provided from the fan 20 through the outer passageway 36 produces the main propulsive thrust generated by the engine 10.

Prior Art Turbine Rear Structural Frame

Figure 2:
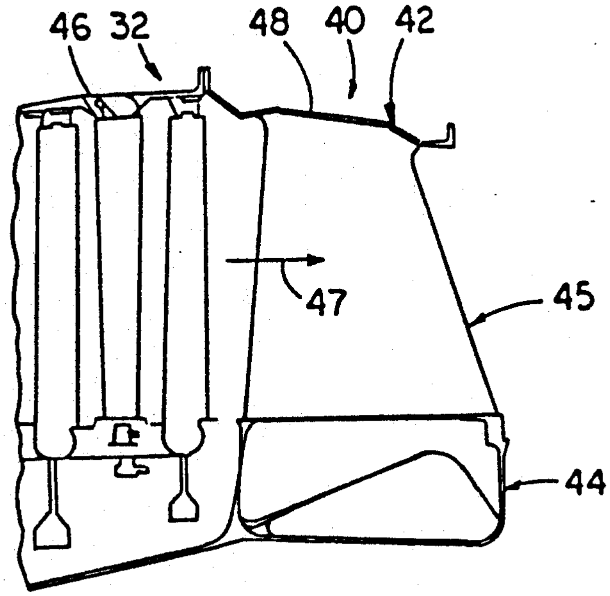
FIG. 2 (PRIOR ART)
FIG. 2 is an enlarged fragmentary longitudinal axial sectional view of a prior art turbine rear structural frame and a portion of a low pressure turbine of the engine of FIG. 1.
Figure 3:
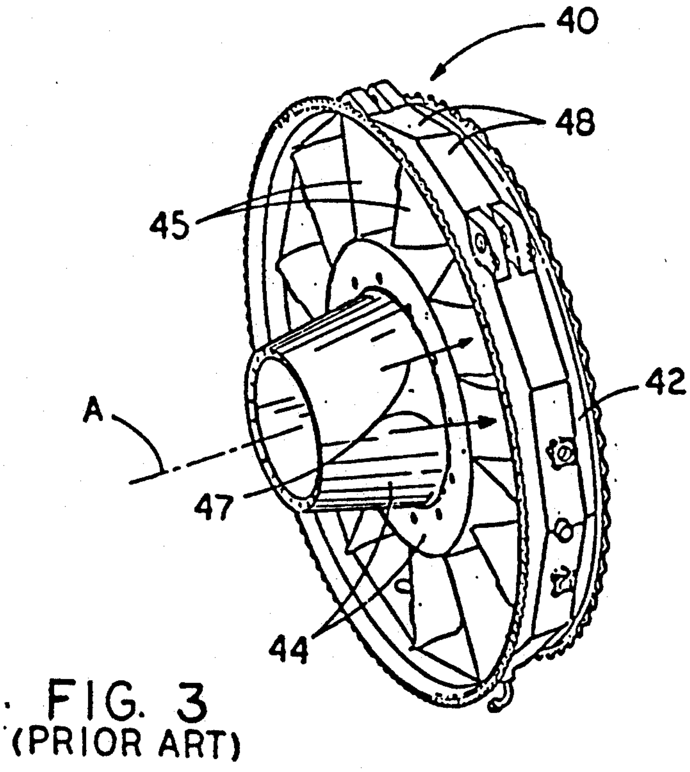
FIG. 3 (PRIOR ART)
FIG. 3 is a perspective view of the prior art turbine rear structural frame of FIG. 2 by itself.

Referring now to FIG. 2 and 3, there is illustrated a prior art annular structural frame 40 being located at the rear end of the low pressure turbine 32, between the low pressure turbine 32 and a rear nozzle 41 (FIG. 1). The frame 40 basically includes an annular outer shell 42, an annular inner central hub 44, and a plurality of circumferentially-spaced radial struts 45 extending between and rigidly connected to the outer shell 42 and central hub 44.

The outer shell 42 of the structural frame 40 is attached to, and extends rearwardly from the casing 46 of the low pressure turbine 32 and provides a series of circumferentially spaced flowpaths 47. The outer shell 42 is constructed of a plurality of panels 48 being connected end-to-end. These panels 48 of the outer shell 42 are of a flat configuration having low resistance to buckling when placed in compression.

Figure 4:
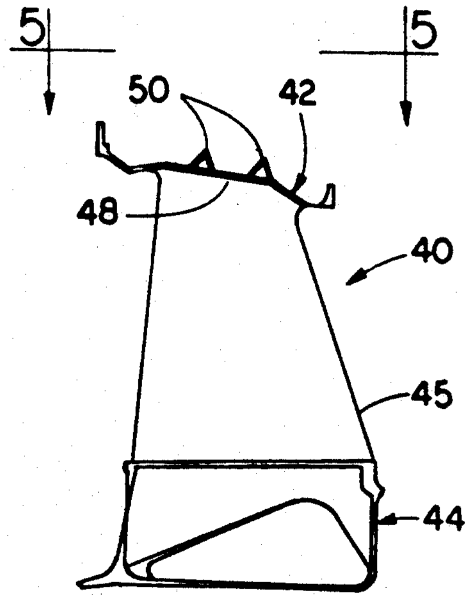
FIG. 4 (PRIOR ART)
FIG. 4 is a view similar to that of FIG. 2 showing the prior art turbine rear structural frame by itself.
Figure 5:
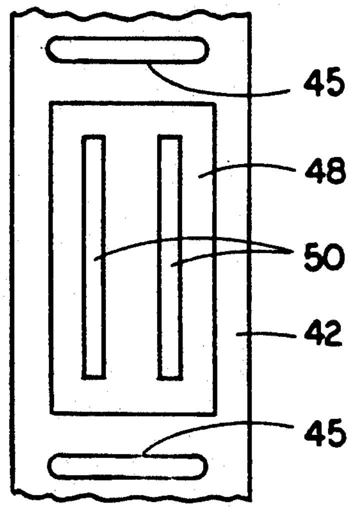
FIG. 5 (PRIOR ART)
FIG. 5 is a top plan view taken along line 5—5 of FIG. 4.

Referring to FIGS. 4 and 5, in order to increase resistance to buckling and improve the stiffness of the outer shell 42, a plurality of circumferential stiffening ribs 50 have been formed in the panels 48. However, disadvantageously, the stiffening ribs 50 tend to provide sites for the concentration of stresses and the initiation and propagation of cracks.

Modified Structural Frame of the Invention

Figure 6:
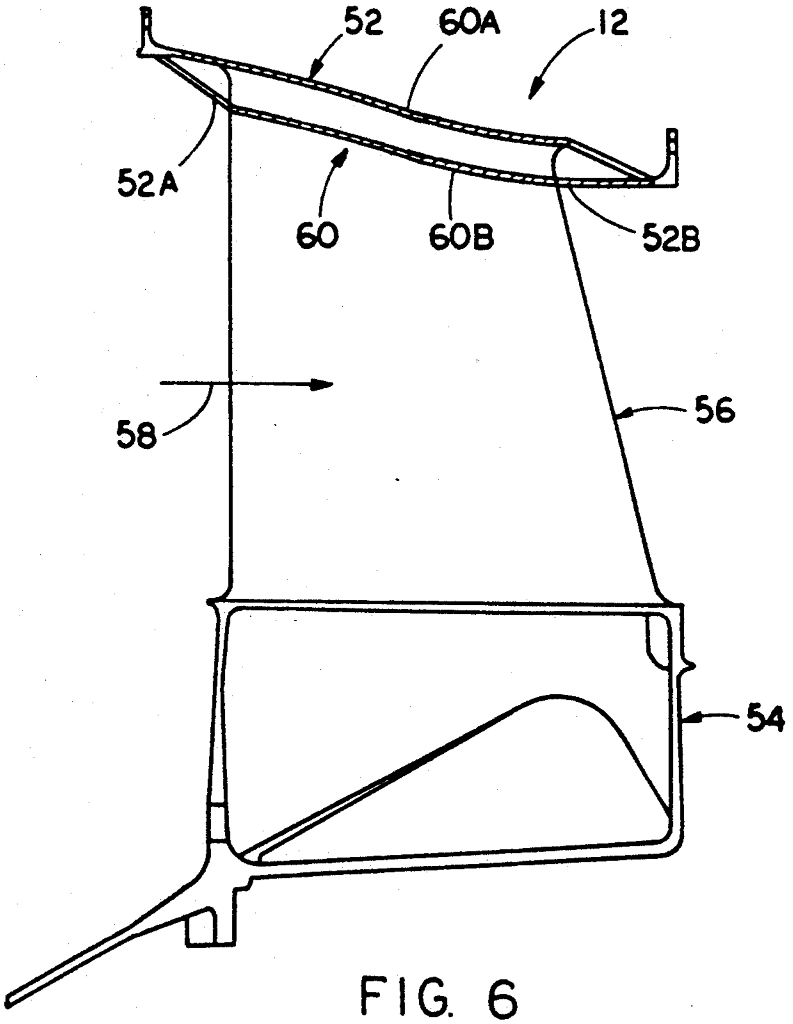
FIG. 6 is a view, on an enlarged scale, similar to that of FIG. 4 but showing a modified turbine rear structural frame of the present invention.

Referring now to FIG. 6, there is illustrated the modified structural frame 12 of the present invention having a configuration which eliminates the need for stiffening ribs and their concomitant disadvantages. While the illustrated modified structural frame 12 embodying the principles of the present invention is located at the rear end of the low pressure turbine 32 of the core engine 22, other structural frames of the engine 10 can advantageously utilize the same principles, if desired.

The modified structural frame 12 basically includes the same general parts as the prior art structural frame 40, namely, an annular outer shell 52, an annular inner central hub 54, and a plurality of circumferentially-spaced struts 56 extending between and rigidly connected to the outer shell 52 and the central hub 54. The outer shell 52 and central hub 54 share a common axis which is coaxial with the central axis A (FIG. 1) of the engine 10. The struts 56 extend radially relative to the axis A. The modified structural frame 12 is attached to, and extends between the rear nozzle 41 and the outer casing 46 of the lower pressure turbine 32. The outer shell 52, central hub 54 and plurality of radial struts 56 together defining a plurality of axially-extending flowpaths 58 spaced circumferentially from one another about the axis A (FIG. 1).

However, the annular outer shell 52 of the modified structural frame 12 includes a plurality of panels 60 each having an axially curved configuration instead of the axially flat configuration of the prior art panels 48. The curved panels 60 are connected end-to-end with one another. The curved configuration of each panel 60 runs in the direction of the axis A. The outer shell 52 has opposite forward and rearward ends 52A, 52B.

FIG. 6 shows axial sections of one of the curved panels 60 along its apex line 60A and apothem line 60B. The curved panels 60 make a smooth transition from the low pressure turbine 32 to the rear nozzle 41 without significantly interfering with the flowpath of gases.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A structural frame for use in a gas turbine engine, comprising:

(a) an annular outer shell;

(b) an annular inner central hub concentric with said outer shell about a common axis; and (c) a plurality of circumferentially-spaced struts extending between and connected to said outer shell and said central hub;

(d) said annular outer shell including a plurality of panels having an axially curved configuration in a plane defined by a radial line and said common axis, said axially curved panels being connected with one another at circumferentially facing ends of each of said panels to form a polygonal shape, wherein said axially curved panels increase buckling resistance capability of said annular outer shell relative to an otherwise similar annular outer shell including axially flat panels.

2. The frame as recited in claim 1 wherein said gas turbine engine includes a low pressure turbine and a rear nozzle, and wherein said axially curved panels provide a smooth transition from said low pressure turbine to said rear nozzle for a flowpath of gases.

3. In a gas turbine engine including a low pressure turbine and a rear nozzle, a structural frame comprising:

(a) an annular outer shell attached to, and extending between said low pressure turbine and said rear nozzle;

(b) an annular inner central hub concentric with said outer shell about a common axis; and (c) a plurality of circumferentially-spaced struts extending between and connected to said outer shell and said central hub and extending radially relative to said axis of said outer shell and inner hub, said outer shell, central hub and plurality of radial struts together defining a plurality of axially-extending flowpaths being spaced circumferentially from one another about said axis;

(d) said annular outer shell including a plurality of axially curved panels connected with one another at circumferentially facing ends of each of said panels to form a polygonal shape, wherein said axially curved panels increase a buckling resistance capability of said annular outer shell relative to an otherwise similar annular outer shell including axially flat panels.

4. In a gas turbine engine including a low pressure turbine and a rear nozzle, a structural frame comprising:

(a) an annular outer shell attached to, and extending between said low pressure turbine and said rear nozzle;

(b) an annular inner central hub concentric with said outer shell about a common axis;

(c) a plurality of circumferentially-spaced struts extending between and connected to said outer shell and said central hub and extending radially relative to said axis of said outer shell and inner hub, sad outer shell, central hub and plurality of radial struts together defining a plurality of axially-extending flowpaths being spaced circumferentially from one another about said axis;

(d) said annular outer shell including a plurality of panels connected with one another so as to form a polygonal shape, said polygonal shape circumscribing said common axis, wherein each of said panels have a curved configuration in a plane defined by a radial lien and said common axis;

(e) wherein sad curved configuration of said panels increases a buckling resistance capability of said outer shell relative to an otherwise similar outer shell including a plurality of shell panels having a flat configuration in said plane; and (f) wherein said curved configuration of said panels provides a smooth transition form said low pressure turbine to said rear nozzle for gases flowing through said flowpaths.

* * * * *